3,717,450
FURNACE FOR MANUFACTURE OF STRIATION-FREE QUARTZ TUBING
Frederick A. Loughridge, Manchester, and William A. Finch, Marblehead, Mass., assignors to Sylvania Electric Products Inc.
Filed Dec. 1, 1970, Ser. No. 94,109
Int. Cl. C03b 5/32, 3/00
U.S. Cl. 65—145
9 Claims

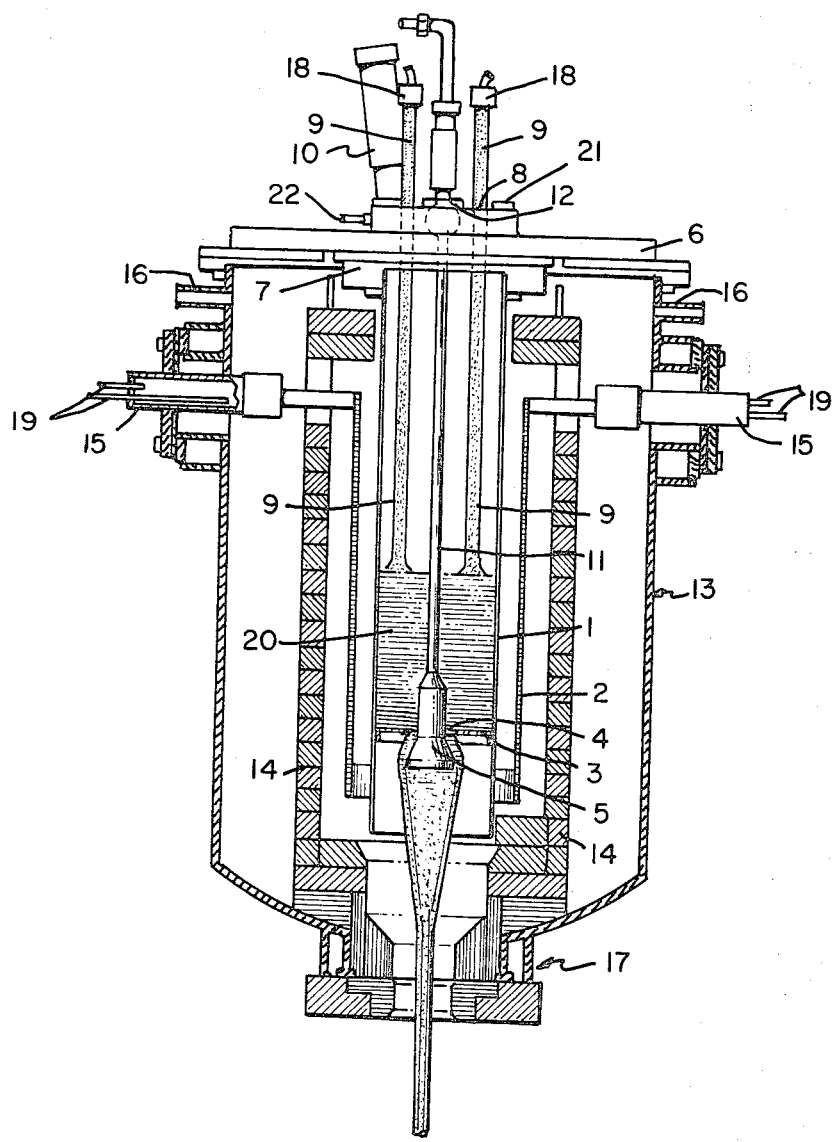
FREDERICK A. LOUGHRIDGE
WILLIAM A. FINCH
INVENTORS
BY James Theodosopoulos
ATTORNEY United States Patent Office 3,717,450
Patented Feb. 20, 1973

ABSTRACT OF THE DISCLOSURE

A furnace includes a refractory metal container for melted quartz surrounded by an electric heater. The bottom of the container has an orifice which includes a mandrel for the purpose of forming quartz tubing. In the cover of the furnace are a plurality of feed holes through which sand-filled quartz tubes can be introduced into the furnace.

The furnace also has gas passages surrounding the holes, the purpose of which is to introduce and maintain a non-oxidizing gas atmosphere in the container and to form a gas lock around the quartz tubes to prevent air from entering the furnace. Included also are movable vacuum supports for supporting the quartz tubes and advancing them into the furnace.

CROSS-REFERENCE TO RELATED APPLICATIONS

In a co-pending application, Ser. No. 749,554, entitled "Manufacture of Striation-Free Quartz Tubing," filed on June 26, 1968 and assigned to the same assignee as the instant application, a process was disclosed for manufacturing striation-free tubing. In that application, after a sand filled tube under vacuum was heated to the softening point, rounded bodies of quartz were formed from the vitreous tube and these bodies were then fed into a melter of conventional design.

In another co-pending application, entitled "Continuous Process for Manufacture of Striation-Free Quartz Tubing," filed on even date herewith by the instant inventors, a process is disclosed that can utilize the furnace of the present invention.

BACKGROUND OF THE INVENTION

Field of the invention

This invention relates to a furnace for manufacture of striation-free quartz or high silica glass tubing. Such glass melts between about 1500° and 2000° C. and comprises materials consisting essentially of silica but which can contain metal oxides of low vapor pressure, such as aluminum oxide, calcium oxide, and magnesium oxide. Such glass can also be doped with heavy metal compounds, such as vanadium, cerium, titanium, iron, copper, and molybdenum.

This glass will hereafter be referred to as quartz, for the sake of simplicity, but it is intended to include all glasses having a silica content greater than about 96% and a melting temperature greater than about 1500° C.

Description of the prior art

In the past, high silica glass tubing has been manufactured by a variety of methods. Moreover, many techniques have been devised for the elimination of striations from the finished product. Inclusion of such striae is quite undesirable for many applications of the tubing, particularly in lamp manufacture, since the appearance is not wholly desirable and light transmission is reduced somewhat.

Striations in the tubing are formed by the inclusion of gas bubbles in the vitreous melt from which the tubing is drawn. The melt is so viscous that even prolonged heating at elevated temperatures will not drive them out. Such gas becomes entrapped when particulate or crystalline refractory materials are dropped on top of the molten mass in the melter. Craggy portions of the crystals rest on top of the melt, forming pockets and prevent the gas in the atmosphere from rising from the interface at the surface of the melt. As the crystals melt, the gas becomes entrapped in these pockets and goes into the melt as bubbles which cannot escape because of the viscosity of the molten glass. Moreover, entrapped gases are also naturally contained within the crystals themselves so that unless they are removed before being fed into the melter, they will enter the melt as bubbles. Subsequent drawing of the melt into tubing elongates the bubbles into striations.

As quartz crystals are heated, they progress through a series of crystalline inversions. Below 573° C., alpha-quartz occurs; between 573° and 870° C., beta-quartz is formed. Between 870° and 1470° C., tridymite forms. Beta-cristobalite forms between 1470° and 1625° C., while above 1710° C., a non-crystalline fused silica forms. Each of these inversions involves reorientation of the crystal structure; differences in thermal expansion rates of the various crystal species produce cracking of the crystals. They shatter and break apart into smaller crystals, thus making their use in a melter even more undesirable. Shattering disturbs the top of the melt and introduces bubbles by creating voids or pockets for gas entrapment.

Entrapment of gas in melted quartz has previously been known to be a problem. For example, U.S. Pat. No. 1,537,036 discloses a method of manufacturing clear quartz ingots by melting the material under vacuum and then subjecting it to pressure to eliminate the bubbles. Such a process is intermittent and does not lend itself to continuous production. Moreover, expensive crucibles have to be discarded after each ingot is formed.

Another U.S. patent, No. 3,261,676, discloses an approach in which a quartz tube is filled with sand and the tube and sand are softened together. When softened and while the tube is under vacuum, the melt is drawn to form a quartz tube. The process is intermittent in concept.

In co-pending application S.N. 749,554, mentioned above, gas-free rounded quartz bodies are formed in a furnace separate from the furnace in which the desired finished striation-free tubing is produced.

SUMMARY OF THE INVENTION

In this invention of a furnace for the continuous manufacture of striation-free quartz tubing, quartz tubes filled with quartz sand are prepared, as disclosed in S.N. 749,554. However, instead of melting the sand under vacuum to form gas-free rounded bodies, as is disclosed in said application, a plurality of such tubes are directly inserted into a quartz melting furnace.

The furnace container holding the melted quartz is made of a suitable refractory metal, such as tungsten or molybdenum, since the usual refractory lining materials for glass furnaces, such as silica or zirconium and aluminum oxide, are unsuitable for quartz, since they are soluble therein.

The sand-filled tubes are attached to suitable vacuum head supports and are inserted into the top of the furnace through separate feed holes therein, each feed hole being only slightly larger than the tubes. As the bottom sealed end of the tube is inserted into the hot zone of the furnace, the sand and surrounding tube melt together into a vitreous material. A vacuum maintained within the tube by the vacuum connection at the open end of the tube removes gases during the melting process. When the temperature of the vitreous material reaches the flow point thereof, it slowly flows downward by gravity and joins the pool of melted quartz in the furnace container. Each tube is advanced into the furnace at a rate about equal to the rate of melting of the lower end thereof, so that only quartz heated above its flow temperature joins the pool of melted quartz in the furnace.

Throughout the process, the interior of the melt container is maintained under a protective atmosphere of inert or reducing gas introduced through nozzles located around the feed holes. The nozzle design and the flow rate of the protective gas are such as to exclude air from the furnace as the tubes are inserted, advanced or removed from the furnace.

After a tube has been inserted into the furnace as far as the vacuum support at its upper end permits, it is slowly withdrawn from the furnace. This withdrawal movement results in stretching of the melted quartz between the lower end of the tube and the pool of melted quartz, with formation of a drawn length of string-like quartz. This length of string-like quartz is severed just outside the furnace, the lower portion thereof falling into the pool of melted quartz and the upper portion thereof being attached to the vacuum head support. The feed hole is then temporarily covered to prevent excessive loss of the protective gas within the furnace, while the remnant of the old tube is removed from the vacuum head and replaced by a new sand-filled tube. The new tube is then inserted into the furnace and melted as previously described.

The feature of this invention that permits continuous manufacture of striation-free tubing over a mandrel located at the lower end of the melt container is that a plurality of tubes are being melted at the same time. Thus the interruption resulting from tube changeover in one of the vacuum heads does not interfere with the continuous manufacture of striation-free tubing. Neither does it significantly affect any of the parameters, such as the height and temperature of the melt, that must be controlled in order to form tubing of desired quality. If the time required for changeover is quite short in relation to the time required to completely melt a usable tube length, then it is usually not necessary to arrange the tubes so that the time of changeover is staggered between the various tubes. But in some cases it may be desirable to arrange a staggered changeover, such as where the changeover interval is relatively long or where the mass of the pool of melted quartz is relatively small in relation to the manufacturing rate of striation-free tubing.

BRIEF DESCRIPTION OF THE DRAWING

The drawing is an elevational view of a furnace in accordance with this invention.

DESCRIPTION OF THE PREFERRED EMBODIMENT

The drawing shows a furnace that can be used in manufacturing striation-free quartz tubing in accordance with this invention. The furnace comprises a refractory metal cylindrical container 1, made of tungsten or molybdenum, and containing a pool of melted quartz 20. Surrounding container 1 is an electric heater 2 which is spaced a short distance from container 1. Heater 2 preferably comprises a tungsten mesh element such as is shown in U.S. Pat. No. 3,178,665.

A refractory metal plate 3 having an orifice 4 serves as a bottom of container 1 in order to contain the pool 20 of melted quartz. Disposed in orifice 4 is a refractory metal mandrel 5, the function of which is to shape the melted quartz and form tubing. Covering the top of container 1 is a water-cooled metal cover 6, preferably made of cast iron, having a suitable high temperature insulation 7 between itself and the top of container 1. There are a plurality of suitable feed holes 8 through cover 6 and insulation 7 to permit insertion therethrough of sand-filled quartz tubes 9 of the type shown in Ser. No. 749,554.

Disposed within cover 6 are suitable gas passages, the purpose of which is to permit a supply of non-oxidizing gas to be introduced through gas inlet 22 to nozzles surrounding feed holes 8. A water-cooled sight glass 10 extending through cover 6 permits external observation of the melting of quartz tubes 9 and the height of the pool 20 of melted quartz. Also extending through cover 6 is a mandrel tube 11, fastened at its bottom to mandrel 5 and at its top, outside the furnace, to a water-cooled mandrel-swivel 12. A passage completely through tube 11 permits flow therethrough of a suitable non-oxidizing gas, the purpose of which is to aid the formation of tubing at mandrel 5.

The entire furnace is surrounded by a steel casing 13 with suitable ceramic brick insulation 14 disposed between heater 2 and casing 13. The space between insulation 14 and casing 13 may be filled with a suitable insulation in powder or granular form. Extending through steel casing 13 are suitable water-cooled power inlets 15 electrically insulated from casing 13. Electric power is supplied to heater 2 by means of suitable conductors 19 in power inlets 15. Also extending through casing 13 are suitable gas inlets 16 the purpose of which is to permit introduction within casing 13 of a non-oxidizing gas. Preferably the gas is slightly reducing, such as 90% $N_2$-10% $H_2$. When the furnace is in operation, the furnace elements must be in a non-oxidizing atmosphere in order to prevent oxidation of the metal parts thereof, especially heater 2, container 1 and mandrel 5. The bottom of casing 13 has a suitable opening, throat 17, through which the formed tubing is removed from the furnace.

In operation, sand-filled quartz tubes 9, attached to suitable movable vacuum supports 18 at their open end, are inserted through feed holes 8 into the interior of container 1. The clearance space around tubes 9 is small in order to aid in preventing air from passing into the interior of container 1. Also, the nozzles surrounding feed holes 8 through which a non-oxidizing gas is fed, are positioned so that some of the gas is deflected downward into container 1 and some of the gas is deflected upward to prevent air from entering container 1.

In operation, the sealed ends of quartz tubes 9 are positioned above the pool 20 of melted quartz and are permitted to be heated to their flow temperature. As a result thereof a portion of the heated tube, with the sand therein, melts to a vitreous condition and smoothly flows downward into pool 20. Throughout the operation a vacuum is maintained on quartz tubes 9 so that the melted portion is substantially gas-free. Quartz tubes 9 are advanced into container 1 at a rate that maintains the height of pool 20, substantially constant, which is necessary for proper dimensional control of the striation-free quartz tubing that is being drawn at the bottom of container 1. The amount of heat supplied to quartz tubes 9 should be sufficient so that, at the rate at which tubes 9 are introduced into container 1, only melted quartz is added to pool 20.

When the entire usable length of a tube 9 has been fed into container 1, that is to say, when support 18 has been advanced as far as is feasible, support 18 is gradually retracted in order to remove the remnant of tube 9 from the furnace. This results in the formation of a drawn length of string-like quartz between pool 20 and support 10. When this string appears just above furnace cover 6, it is broken, thereby permitting the lower portion of the string to fall into the pool. At this time a small lid 21 is placed on the feed hole in order to prevent excessive loss of non-oxidizing gas, and a new sand-filled quartz tube 9 of suitable length is mounted in support 18. The small cover is then removed from feed hole 8 and the new tube 9 is inserted into the furnace and melted as before.

The furnace is operated in such a manner relative to (1) the rate of forming striation-free tubing, (2) the amount of electric power supplied and (3) the number of quartz tubes 9, that the height of pool 20 is sufficiently constant to properly control the dimensions of formed tubing. If necessary to maintain this control, the length and quantity of quartz tubes 9 may be staggered so that there are never more than, say, about one or two being changed over at any one time.

The furnace is constructed so that the inert or reducing gas that enters through gas inlets 16 flows out of the furnace through throat 17, in order to create a positive gas pressure inside casing 13 and thereby prevent entry of air into the furnace through throat 17. Also, container 1 is attached to cover 6 in such a manner that there are no gas passages between container 1 and the remainder of the furnace. This prevents any chimney effect which might draw upward the gas entering through inlet 16 and thereby permit air to enter the furnace at throat 17. The effect of this construction is that the gas entering container 1 through gas inlet 22 creates a positive gas pressure inside container 1, the excess gas flowing out through feed holes 8.

As our invention, we claim:

1. A furnace for the manufacture of striation-free quartz tubing comprising: a refractory metal container containing a pool of melted quartz and having an orifice at the bottom thereof; an electric heater surrounding, and spaced from, said container; a cover, having a plurality of feed holes therethrough, attached to said container, the attachment therebetween being gas tight; vertically movable vacuum supports disposed above each feed hole; consumable sand filled quartz tubes sealed at the bottom, supported in said vacuum supports and extending through said feed holes to said pool of melted quartz; means for drawing melted quartz through said orifice to form tubing; means for advancing said sand filled quartz tubes into said container; means for maintaining a vacuum within said sand filled quartz tubes; means for maintaining said electric heater in a non-oxidizing atmosphere; and means for maintaining the interior of said container in a non-oxidizing atmosphere.

2. The furnace of claim 1 including a tubing-forming mandrel disposed at the bottom of said furnace.

3. The furnace of claim 1 including separate lids for covering each feed hole.

4. The furnace of claim 1 including a sight glass extending through said cover.

5. The furnace of claim 1 wherein said means for maintaining the interior of said container in a non-oxidizing atmosphere includes gas passages within said cover, the outlet for said passages being located at said feed holes.

6. The furnace of claim 5 wherein said outlets are positioned so that, when non-oxidizing gas flows therethrough, part of said gas flows downward and part of said gas flows upward.

7. The furnace of claim 2 wherein a mandrel swivel is disposed above said cover, extends through said cover and said container, and is connected to said tubing-forming mandrel.

8. The furnace of claim 7 including means for flowing a gas through said mandrel swivel and said mandrel in order to aid in forming quartz tubing.

9. The furnace of claim 1 wherein said container is attached to, and supported by, said cover, the attachment therebetween being gas tight.

References Cited

UNITED STATES PATENTS

| | | | |
|---|---|---|---|
| 3,261,676 | 7/1966 | Morelock | 65—32 X |
| 3,212,871 | 10/1965 | Vatterodt | 65—32 X |
| 3,320,045 | 5/1967 | Weiss et al. | 65—335 |
| 3,508,900 | 4/1970 | Loughridge et al. | 65—335 X |
| 3,540,870 | 11/1970 | Li | 65—32 X |
| 2,292,826 | 8/1942 | Devers | 65—DIG. 8 |
| 3,429,684 | 2/1969 | Plumat | 65—335 |
| 2,155,131 | 4/1939 | Hanlein | 65—157 |

FRANK W. MIGA, Primary Examiner

U.S. Cl. X.R.

65—146, 157, 335, 347, 32, DIG. 8